May 13, 1969   K. M. HILLAS   3,444,024
PROCESS FOR BONDING NON-WOVEN SCRIM
Filed Dec. 21, 1965
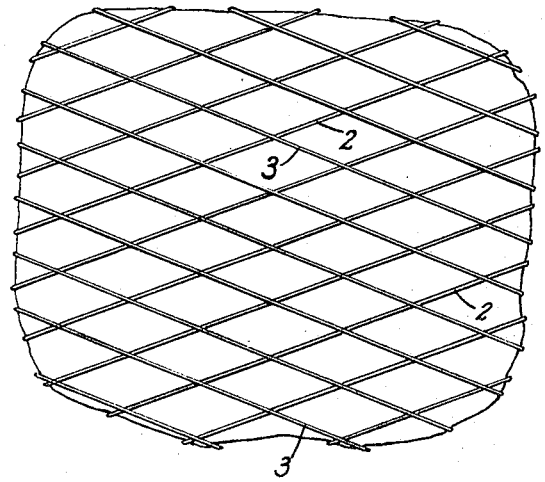
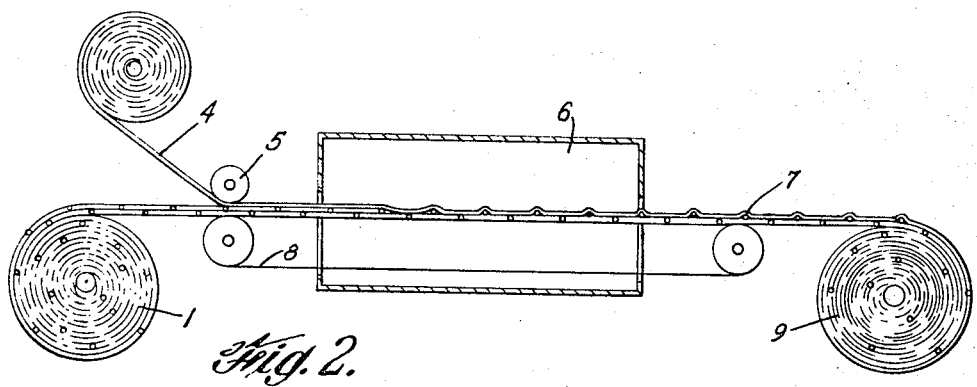
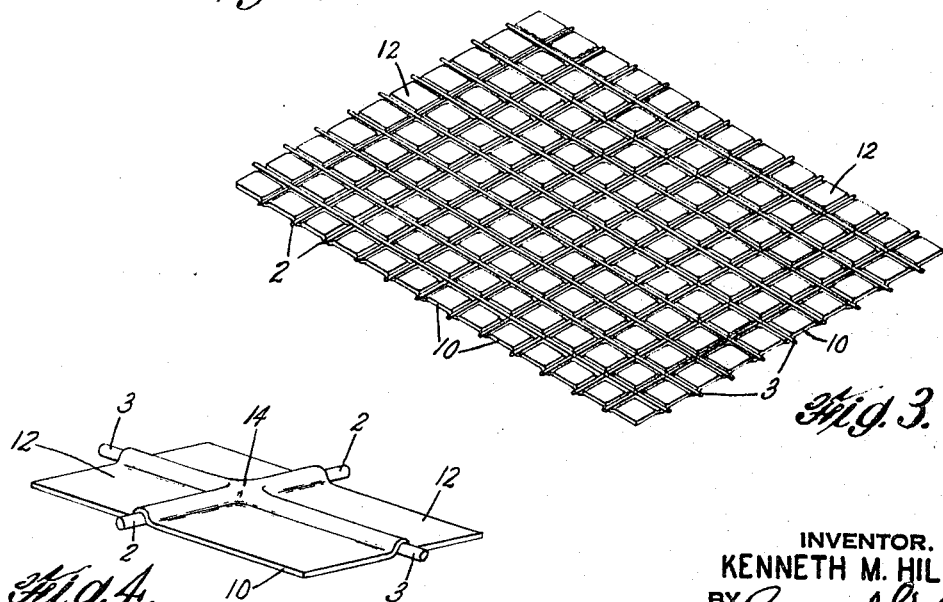
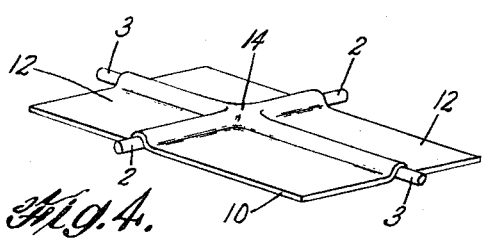
INVENTOR.
KENNETH M. HILLAS
BY
ATTORNEY

United States Patent Office 3,444,024
Patented May 13, 1969

3,444,024
PROCESS FOR BONDING NON-WOVEN SCRIM
Kenneth M. Hillas, Boonton, N.J., assignor to Union
Carbide Corporation, a corporation of New York
Filed Dec. 21, 1965, Ser. No. 515,409
Int. Cl. B32b 31/26
U.S. Cl. 156—306                                    6 Claims This invention relates to the manufacture of bonded non-woven scrim.

Non-woven scrim, that is, a non-woven fibrous product in which the spaced apart strands thereof are formed in at least two unbonded layers of parallel strands have been widely employed in the reinforcement of plastic, paper and non-woven mats. However, in order to use such products, it has been necessary to interbond the strands of each layer with strands in the other layer. Typically, this has been accomplished by coating the strands with adhesive or by laminating the scrim between plastic and/or paper films.

The adhesive bonding technique of forming an integral product from such scrim creates considerable difficulties. First of all, it is difficult to get enough adhesive at the points where the strands cross because of the open structure and light weight of the scrim. Moreover, adhesive bonding results in substantial losses of adhesive. Such a technique is extremely costly and, at best, does not make a scrim product which has good tear resistance.

In the plastic lamination process, already bonded scrim is typically fed between two rolls of plastic into hot calendar or lamination rolls. These rolls are at high temperatures, usually above the softening temperature of the plastic and, because of the openness of the scrim, each layer of plastic adheres to the other but not directly about the strands. In effect, the scrim product is only loosely encapsulated by the multiple plastic layers. As a result, the scrim is capable of movement between the two layers, constantly shifting position according to the tension exerted on the laminate, and quite often the scrim strands in each layer bunch together so that the fiber reinforcement becomes localized and the plastic layers become separated. The net result is an inferior product with limited utility.

There is described herein a process and a product therefrom which avoids the difficulties described above. The product of this invention is very simple to make and the fibers of the scrim are very securely locked such that when the scrim is used in plastic laminate formation, the fibers do not bunch up when the laminate is placed under tension.

The process of this invention involves placing a layer of thermoplastic resin, typically having a thickness not in excess of about 20 mils, preferably not in excess of about 10 mils, on top of a non-woven unbonded scrim, as described above, and feeding the scrim with its attendant top layer into a heated zone provided at a temperature above the heat deformation temperature of the layer but below the melting temperature of the layer. As a result, the plastic layer on top of the scrim is heated to its heat deformation temperature causing the unsupported sections of the layer, which is super-imposed over the open spaces between the strands, to collapse between the open strands and deforming to wrap itself about the strands of the scrim at points where the layer contacts the scrim, including the points where said scrim strands cross. Thus, part of the layer of resin fills the open spaces between the strands. As a result, the layer possesses raised and lowered portions, the lower portions being called valleys and existing between parallel scrim strands in the open spaces between the scrim strands. The surface of the layer facing the scrim and existing at the valley portion is on at least a plane essentially the same as or below that of the uncoated surface of the strands not covered or in contact with the layer. If desired, the surface of the layer facing the scrim and at the portions thereof which form the valleys between the scrim, may reside below the surface of the scrim. Then the scrim, with its attendant covering of deformed resin layer, is removed from the heated zone and cooled so that it can be employed per se or converted to another form. In a significant embodiment of this invention, all of the strands of the scrim are at least partially covered by the layer of resin.

In a further embodiment of this invention, a layer of thermoplastic resin, as described above, is deposited on top of a non-woven scrim, as described above, and the combination is placed in a heated zone and supported therein by pintenter frames which hold either the ends of the scrim or the combined ends of the scrim and resin layer. The layer softens and deforms in the oven, and thus, collapses between the strands through the open spaces of the scrim. The portion of the layer in the open spaces is allowed to extend below the surface of the scrim. Then the coated scrim with part of the layer extending below the scrim is rested upon a heated solid surface (such as a heated roll or heated flat endless belt) having a temperature above the deformation temperature of the layer but below the melting point of the layer so that the part of the layer extending below the scrim first contacts the surface. The surface of the layer extending below the scrim (appearing as small sacks hanging from the scrim) is gently rested upon the heated solid surface so that the sack-like surfaces of the layer are deformed and flattened out and lapped over the surface of the scrim not already covered by layer. Then the layer is cooled below its deformation temperature. As a result, essentially all of the strand surfaces of the scrim are coated by a single layer of thermoplastic resin. To achieve total enclosure of the strands, the bonded scrim may be put through hot calender rolls slightly above the melting temperatures of the resin layer to cause the lapped positions of the layer to interbond or bond with the upper surface of the layer bonded to the scrim.

For the purpose of more graphically illustrating this invention, reference is made to the accompanying drawing.

FIGURE 1 depicts a top view of a scrim useable in the practice of this invention.

FIGURE 2 illustrates a side view of a process of bonding the scrim of FIGURE 1.

FIGURE 3 is an isometric illustration of the bonded scrim produced by the process of FIGURE 2.

FIGURE 4 is an enlarged view of a section of the bonded scrim of FIGURE 3.

With respect to FIGURE 1, there is illustrated a non-woven scrim possessing parallel strands 3 and parallel strands 2 wherein strands 2 and 3 exist in different planes. As can be seen from FIGURE 1, the parallel strands have open spaces between them and, viewing the scrim as a whole, there are open spaces existing between the combinations of strands 2 and 3 forming the scrim pattern.

With respect to FIGURE 2, a roll of scrim 1 is unwound and the scrim is delivered to an endless belt 8, e.g., made of a Teflon coated steel band, release paper-coated fabric or metal band, or silicone (release agent)-coated metal band, and placed on top of scrim 1 is resin layer 4 also unwound from a roll. Endless belt 8 rotates on wheels as shown in the drawing. Compression roller 5 serves the purpose of aligning resin layer 4 on scrim 1 and the combination of scrim 1 and layer 4 is passed into oven 6 heated to a temperature above the deformation temperature of layer 4. While in the oven, layer 4 is softened and caused to deform and wrap itself onto scrim 4 resulting in bonded scrim 7. Bonded scrim 7 is collected at the end of the line as roll 9. FIGURE 3 illustrates a bottom view of layer-bonded scrim 7. Layer-bonded scrim 7 contains crossing strands 2 and 3 and resin layer 10 bonded thereto. Between the open spaces of crossing strands 2 and 3 is raised portions 12 of layer 10. As shown in FIGURE 4, raised portions 12 are, in reality, valleys when the scrim is viewed from the layer or top side. As shown in FIGURE 4, crossing strands 2 and 3 are covered by layer 10 and layer 10 wraps about strands 2 and 3 to enclose them and lock them in position, particularly at crossing point 14. To achieve this locking action, it is necessary for the layer to sink and depress to form valleys 12 in the open spaces between strands 2 and 3.

A significant advantage of the bonding system of this invention is that it facilitates excellent bonding with other film materials, such as plastics, paper, wood, metal, fabrics, and the like. Because the layer fills the spaces between the strands and one of its surfaces is essentially at the same or lower level as the viewable or unbonded surface of the scrim, the whole, layer-bonded scrim can be adhesively secured to another film. If the layer did not so exist between the open spaces of the scrim, bonding would only occur where the scrim contacts the film. Since the scrim possesses a small surface area, bonding would not be as sturdy and the resulting bonded scrim would be likely, on stretching, pulling and twisting, to break free of its bond to the film and the strands would bunch together. This is avoided with the laminates of this invention because essentially all of the surface of the bonded scrim is locked together by the combination of the resin layer and the adhesively bonded film.

A most desirable laminate of this invention involves employing a film composed of a thermoplastic resin which is melt compatible with the thermoplastic resin used in the layer. For example, it is most desirable to use a layer of polyvinyl chloride and a film of polyvinyl chloride or a layer of polyethylene and a film of polyethylene. These are inexpensive plastics which give superb bonding of the scrim. In making this product, the film resin may be extruded from a slot extruder as a film onto the underside of the layer-bonded scrim followed by passage of the laminate through rolls to secure the film to the layer or the film already produced, can be bonded to the layer-bond scrim on hot lamination rolls, using, in both cases, well known techniques.

Illustrative of thermoplastic resins which may be used as either the layer or film in bonding the scrim include polyethylene, polyvinyl chloride, copolymers of vinyl chloride and vinyl acetate, polypropylene, polyhexamethyleneadipamide, polyepsilon-caprolactam, polyethyleneterephthalate and other thermoplastic polyesters, thermoplastic polyurethanes, polyacrylates, and the like.

The non-woven scrim product may be made of strands of any one of a broad variety of fibers such as polyethylene fibers, polypropylene fibers, mixtures of polyethylene and polypropylene fibers, nylon fibers (such as the nylons described above), polyester fibers (such as the polyesters described above), acrylic and modacrylic fibers such as polyacrylonitrile fibers and acrylonitrile and vinyl chloride copolymer fibers, polystyrene fibers, polyvinylacetate fibers, polyvinyl chloride fibers, cellulose acetate and triacetate fibers, glass fibers, viscose fibers, and the like. In addition to the above synthetic fibers there may be used also the natural fibers such as cotton, wool, hogs hair, horse hair, vicuna, and the like.

Instead of utilizing melt compatible films and layers, it is feasible in the practice of this invention to apply an adhesive over either the film or the layer-bonded scrim and effect lamination by simple contact of the two followed by curing or drying of the adhesive. Suitable adhesives include the rubber adhesives such as natural or synthetic rubber solutions, polyvinyl chloride solutions, polyvinylacetate solutions, copolymers of vinyl acetate and vinyl chloride, copolymers of vinyl acetate, vinyl chloride and acrylic acid, nitrocellulose adhesive, ethylcellulose adhesive, animal glues, and the like. The selection of adhesive is not critical to this invention unless the particular utility to which the total laminate is to be employed requires optimum adhesion between the layer-bonded scrim and the film.

I claim:

1. A process for bonding non-woven scrim which comprises covering a non-woven scrim composed of at least two unbonded layers of essentially parallel spaced-apart strands with a layer of thermoplastic resin and then, while said resin covered scrim rests on a flat surface, heating said layer of thermoplastic resin at a temperature above the heat deformation temperature and below the melting temperature of the resin for a period of time sufficient to cause the layer of resin to deform under its own weight so as to conform to the upper surfaces of the strands of the scrim without the formation of openings in said resin layer, said flat surface preventing said resin sheet from sinking below the plane of said scrim, and then cooling the covered scrim below the heat deformation temperature of the resin.

2. A process for bonding non-woven scrim which comprises covering a non-woven scrim composed of at least two unbonded layers of essentially parallel spaced-apart strands with a layer of themoplastic resin and then, while said resin covered scrim is suspended from its edges, heating said layer of thermoplastic resin at a temperature above the heat deformation temperature and below the melting temperature of the resin for a period of time sufficient to cause the layer of resin to deform under its own weight so as to sink between the strands of said scrim below the plane of said scrim, contacting said resin covered scrim on the uncovered underside with a flat surface heated above the heat deformation temperature of the resin but below the melting temperature of the resin, said heated surface first contacting the portions of the resin layer which have sunk below the strands of the scrim, whereby additional portions of the strand surface are coated with said resin and then cooling the covered scrim below the heated deformation temperature of the resin.

3. A process according to claim 1 wherein the bonded scrim thus produced is laminated with a thermoplastic film.

4. A process according to claim 3 wherein the resin of the thermoplastic layer is melt-compatible with the resin of the thermoplastic film.

5. A process according to claim 3 wherein both the thermoplastic layer and the thermoplastic film comprise a polyvinylchloride resin.

6. A process according to claim 3 wherein both the thermoplastic layer and the thermoplastic film comprise polyethylene.

References Cited

UNITED STATES PATENTS

| | | | |
|---|---|---|---|
| 2,772,993 | 12/1956 | Magnuson | 161—97 X |
| 2,418,904 | 4/1947 | Rugeley et al. | 156—306 X |
| 2,767,113 | 10/1956 | Bower | 161—140 |
| 2,282,168 | 5/1942 | Cunningham | 161—144 |

ROBERT F. BURNETT, *Primary Examiner.*

M. A. LITMAN, *Assistant Examiner.*

U.S. Cl. X.R.

156—178; 161—89, 92, 98, 113